(12) United States Patent
Naji et al.

(10) Patent No.: US 6,893,751 B2
(45) Date of Patent: May 17, 2005

(54) COMPOSITE PRODUCT

(75) Inventors: Basil Naji, Toongabbie (AU); John Sydney Cottier, Oatley (AU); Robert Lyons, Alta Loma, CA (US)

(73) Assignee: James Hardie Research Pty Limited (AU)

( * ) Notice: Subject to any disclaimer, the term of this patent is extended or adjusted under 35 U.S.C. 154(b) by 0 days.

(21) Appl. No.: 10/090,406

(22) Filed: Mar. 4, 2002

(65) Prior Publication Data

US 2002/0192510 A1 Dec. 19, 2002

(30) Foreign Application Priority Data

| Mar. 2, 2001 | (AU) | PR3474 |
| Mar. 2, 2001 | (AU) | PR3475 |
| Mar. 2, 2001 | (AU) | PR3476 |
| Mar. 2, 2001 | (AU) | PR3477 |
| Mar. 2, 2001 | (AU) | PR3478 |

(51) Int. Cl.$^7$ .................. B32B 13/00; B32B 13/14; C04B 18/00
(52) U.S. Cl. .............. 428/703; 428/323; 428/336; 428/446; 106/624; 106/692; 106/705; 106/737; 106/DIG. 1
(58) Field of Search ............... 428/703, 446, 428/323, 325, 336; 106/624, 692, 712, 737, 705, DIG. 1

(56) References Cited

U.S. PATENT DOCUMENTS

| 4,052,220 A | | 10/1977 | Turpin, Jr. | |
| 4,134,773 A | | 1/1979 | Simeonov et al. | |
| 4,339,289 A | | 7/1982 | Lankard | |
| 4,344,804 A | | 8/1982 | Bijen et al. | |
| 4,374,672 A | | 2/1983 | Funston et al. | |
| 4,379,729 A | | 4/1983 | Cross | |
| 4,383,960 A | | 5/1983 | Delcoigne et al. | |
| 4,403,006 A | * | 9/1983 | Bruce et al. | 428/70 |
| 4,411,723 A | * | 10/1983 | Takeuchi | 156/242 |
| 4,441,944 A | | 4/1984 | Massey | |
| 4,495,301 A | | 1/1985 | Sutor | |
| 4,507,154 A | | 3/1985 | Burge et al. | |
| 4,721,160 A | | 1/1988 | Parcevaux et al. | |
| 4,767,491 A | | 8/1988 | Vittone et al. | |
| 4,816,091 A | | 3/1989 | Miller | |
| 4,818,595 A | * | 4/1989 | Ellis | 442/68 |
| 4,840,688 A | | 6/1989 | Vogt | |
| 4,904,503 A | | 2/1990 | Hilton et al. | |
| 4,933,031 A | | 6/1990 | Blomberg et al. | |
| 4,981,740 A | * | 1/1991 | Larsen | 428/34.4 |
| 4,994,113 A | | 2/1991 | Helmstetter | |
| 5,108,510 A | | 4/1992 | Burge et al. | |
| 5,192,366 A | | 3/1993 | Nishioka et al. | |
| 5,236,773 A | * | 8/1993 | Sorathia et al. | 428/213 |
| 5,338,357 A | | 8/1994 | Takai et al. | |
| 5,346,012 A | | 9/1994 | Heathman et al. | |
| 5,583,079 A | | 12/1996 | Golitz et al. | |
| 5,681,384 A | | 10/1997 | Liskowitz et al. | |
| 5,728,458 A | | 3/1998 | Sweeney | |
| 5,820,668 A | | 10/1998 | Comrie | |
| 5,888,322 A | | 3/1999 | Holland | |
| 5,900,053 A | | 5/1999 | Brothers et al. | |
| 5,997,630 A | | 12/1999 | Angelskar et al. | |
| 6,008,275 A | | 12/1999 | Moreau et al. | |
| 6,030,447 A | | 2/2000 | Naji et al. | |
| 6,143,069 A | | 11/2000 | Brothers et al. | |
| 6,204,214 B1 | | 3/2001 | Singh et al. | |
| 6,387,175 B1 | | 5/2002 | Lynn et al. | |
| 6,482,258 B2 | | 11/2002 | Styron | |
| 6,485,561 B1 | | 11/2002 | Dattel | |
| 6,506,248 B1 | | 1/2003 | Duselis et al. | |
| 6,572,697 B2 | | 6/2003 | Gleeson et al. | |
| 6,641,658 B1 | | 11/2003 | Dubey | |
| 6,676,745 B2 | | 1/2004 | Merkley et al. | |
| 6,682,595 B1 | | 1/2004 | Barbour | |
| 6,692,564 B2 | | 2/2004 | Hofmann | |
| 6,749,897 B2 | | 6/2004 | Naji et al. | |
| 2002/0192510 A1 | | 12/2002 | Naji et al. | |
| 2003/0164119 A1 | | 9/2003 | Naji et al. | |

FOREIGN PATENT DOCUMENTS

| CN | 1160070 | 9/1997 |
| CN | 1178202 | 4/1998 |
| CN | 1251358 | 4/2000 |
| DE | 143936 | 9/1980 |
| DE | 19607081 | 8/1997 |
| EP | 678488 | 3/1995 |
| EP | 328431 | 1/1999 |
| FR | 2512440 | 3/1993 |
| IT | 1311962 | 3/2002 |
| JP | 55130847 | 10/1980 |
| JP | 57017452 | 1/1982 |
| JP | 58149939 | 9/1983 |
| JP | 59107985 | 6/1984 |
| JP | 60-191074 | 9/1985 |
| JP | 63008248 | 1/1988 |
| JP | 63248751 | 10/1988 |
| JP | 03295843 | 12/1991 |
| JP | 04002642 | 1/1992 |
| JP | 4089340 | 3/199 |
| JP | 5-154816 | 6/1993 |
| JP | 7187734 | 7/1995 |
| JP | 8-67541 | 3/1996 |
| JP | 08073283 A | 3/1996 |
| JP | 09052747 A | 2/1997 |
| JP | 9227200 | 9/1997 |
| JP | 2000-302522 | 10/2000 |
| JP | 2001316157 | 11/2001 |

(Continued)

Primary Examiner—Stephen Stein
(74) Attorney, Agent, or Firm—Knobbe Martens Olson & Bear LLP

(57) ABSTRACT

A composite product comprising a substrate layer and one or more functional layers applied thereto. The slurry is applied to the substrate layer to form a functional layer and the functional layer dewatered through the substrate layer. The functional layers can be repeated to build up a laminated composite product. Functional additives may be included in each layer to provide desired properties to that layer and indeed to the subsequent composite product.

27 Claims, No Drawings

FOREIGN PATENT DOCUMENTS

| | | |
|---|---|---|
| JP | 2002053361 | 2/2002 |
| KR | 2000014685 | 3/2000 |
| RU | 1571024 | 6/1990 |
| RU | 2157796 | 10/2000 |
| RU | 2161695 | 1/2001 |
| RU | 2167485 | 6/2001 |
| WO | WO 92/00251 | 6/1991 |
| WO | WO 97/21640 | 12/1996 |
| WO | WO 99/08885 | 2/1999 |
| WO | WO 00/48960 | 2/2000 |

* cited by examiner

COMPOSITE PRODUCT

PRIORITY CLAIM

This application claims priority from the following Australian provisional patent applications, the full contents of which are hereby incorporated by cross-reference.

| Application No | Title | Date Filed |
|---|---|---|
| PR3474 | A composite Product | Mar. 2, 2001 |
| PR3475 | Spattering Apparatus | Mar. 2, 2001 |
| PR3476 | Additive for a Dewaterable Slurry | Mar. 2, 2001 |
| PR3477 | A metod and Apparatus for Forming a Laminated Sheet Material by Spattering | Mar. 2, 2001 |
| PR3478 | Coatings for Building Products | Mar. 2, 2001 |

BACKGROUND OF THE INVENTION

1. Field of the Invention

The present invention relates to composites and particularly, but not limited to, fibre reinforced building composites.

2. Description of the Related Art

Any discussion of the prior art throughout the specification should in no way be considered as an admission that such prior art is widely known or forms part of common general knowledge in the field.

Fibre reinforced cement (FRC) is an extremely popular building product.

The applicant along with other various parties have developed a variety of techniques for producing fibre reinforced cement building products and tailoring those FRC products to the particular environment of use.

There are still, however, certain limitations with regard to FRC products. They have limited acoustic, thermal and fire retardant properties. They can exhibit limited workability and generally lie in the medium density range (around 1300 kg/m$^3$) or higher (compressed densities of around 1700 kg/m$^3$).

Generally, the properties of fibre cement are altered by addition of other materials eg different fibres, fillers etc or altered with different production techniques. Such alterations to the FRC formulation, however, can be expensive to develop in order to ensure no detrimental side effects arise from such new formulations. Alterations in production methods or equipment are also expensive and time consuming to develop. Such techniques also do not provide for true "tailoring" of the FRC product. It is, of course, inappropriate to shut down an entire production line, for example, to produce a small batch of FRC product tailored to a specific use.

It is an object of the present invention to overcome or ameliorate at least one of the disadvantages of the prior art, or to provide a useful alternative.

SUMMARY OF THE INVENTION

In a broad aspect, the present invention provides a composite product comprising a substrate layer and one or more functional layers applied thereto, each functional layer including a mixture of hydraulic binder, dewatering agent wherein the quantity of dewatering agent is sufficient to permit de-watering of each functional layer through the substrate layer and any additional functional layer.

In a second aspect, the present invention provides a method of manufacturing a composite product comprising:

(i) providing a substrate layer,
(ii) providing a slurry formulation including an hydraulic binder and dewatering agent,
(iii) applying said slurry to said substrate layer to form a functional layer,
(iv) dewatering the functional layer, and
(v) optionally repeating steps (ii) through (iv), wherein the quantity of dewatering agent is sufficient to maintain porosity and thereby permit de-watering of each functional layer through the substrate layer and any additional functional layer.

Preferably, the substrate layer is a fibre reinforced base material such as fibre reinforced cement. This substrate layer provides a structural base on which additional functional layers may be added.

The functional layers may be added to both sides of the substrate layer but most preferably are added to one side which generally expose one side of the building board during production. Such a technique allows the aforementioned method to be applied to current FRC production techniques such as Hatschek.

DETAILED DESCRIPTION OF THE PREFERRED EMBODIMENTS

The present applicants have developed a process for manufacture of a composite article to virtually any desired specification or use. To explain, the present inventive composite and method starts with a simple water permeable substrate layer such as conventional fibre reinforced building board. To this base layer are added one or more functional layers, each functional layer being specifically tailored to provide the desired functionality. For example, if it is desired to provide an insulating layer, the slurry formulation from which the functional layer is formed can include insulating materials such as rubber crumbs, vermiculite, perlite, gypsum, etc.

Similarly, water permeability may be decreased by including water resistant polymers eg silanes, siloxane blends etc or pozzalanic materials such as silica fume, metakaoline, ultrafine fly ash etc.

Density modification of the functional layer can be accomplished by addition of suitable light weight materials such as cenospheres (ceramic hollow spheres), expanded polystyrene, vermiculite, perlite etc.

The inventive process enables various functional layers to be integrated into a single composite by appropriate slurry modification.

In a preferred embodiment, each functional layer has a reinforcing layer positioned therebetween. The reinforcing layer may comprise fibre mesh or netting, and serves to improve the strength and durability of the composite product.

In some instances, the reinforcing layer may comprise a thin fibre reinforced cementitious layer similar for instance to the base material. This provides for more efficient utilisation of such fibre reinforced layers, similar to sandwich composite technology. It will be appreciated by a person skilled in the art, that there are areas of a composite which require less fibre reinforcement ie the core. Such a core area can be formed as the aforementioned functional layer with low fibre reinforcement. Areas which require high fibre reinforcement due to high tensile strength ie surface or skin areas, can be covered by a fibre reinforced cementitious layer. The thus formed fibre reinforced layers act as sandwich skins with a de-watered slurry functional layer acting as a sandwich core.

As a result, the described composite provides significant advantages over monolithic fibre reinforced composites. Firstly, by the aforementioned composite action, fibres can be positioned in areas where they are most required. This will, of course, lead to a reduction in the fibre reinforced volume of the product.

Secondly, such a reduced fibre volume will lead to an improvement in non-combustibility and thermal insulation performance of the composite. Production of a non-combustible composite has, in the past, been difficult to achieve due the high cost of non-combustible fibres and specialised processes required for their use.

Further, one of the most important advantages arising from preferred embodiments of the present invention is the ability to concentrate a particular functionality into a single layer. To explain, in large monolithic structural layers, particularly fibre reinforced cement building products, any adjustments to the functional or structural aspects of the product, au be diluted or diminished or unevenly spread throughout the product. There is also the possibility of adverse side reactions occurring during production of such a monolithic product which may diminish the structural or functional attributes required. With the present invention, on the other hand, it is possible to concentrate or target specific functional or structural attributes within a single functional layer thereby assuring the attribute is provided to the resultant composite product.

Indeed, various optional additives and filler can be incorporated for specific purposes, ie acoustic, thermal or fire performance, density modification, cost or production efficiency.

A top or finish coating layer can also be provided for the composite product by a fibre reinforced cementitious layer, a material similar or identical to the functional layer or any other product. In one particularly preferred embodiment, the top or finishing coating can be primarily an "aesthetic" layer of, say, ultrafine particle size or made from a sandable material to smooth the exterior surface of the composite product and thereby provide a finish/paint ready surface.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

The dewatering agent serves to maintain sufficient porosity in the slurry and product to be coated to permit dewatering of the slurry through the product to be coated. Preferably, the dewatering agent is a particulate material such as fly ash, alumina trihydrate, silica flour, cenospheres (ceramic hollow spheres) or similar.

Fly ash is particularly preferred as it permits dewatering of the slurry within a few minutes. Other particulate dewatering agents such as alumina trihydrate or silica flour may also be used, however, they increase the time required for dewatering of the slurry through the product to be coated.

In a preferred embodiment, the slurry applied to the product to be coated has a high water content. Preferably, the water content can be up to about 50%. This is in contrast to previous cementitious formulations which generally have a very high solids content.

By combining the various components of the formulation described above, a self levelling dewaterable slurry is obtained which can be applied to the substrate layer, dewatered through the substrate layer and thereby provide a uniform coating over this substrate layer.

Normally, after application of the coating, the resultant product would be normally cured, steam cured or hydrothermally cured, ie autoclaved, and if required, sanded to a smooth flat finish.

The substrate layer to which the functional layers can be applied is virtually limitless provided the slurry can be dewatered through the substrate layer. Cementitious and gypsum building boards are typical examples of suitable building products on which the coating can be applied.

The thickness of the functional layers would range from around 0.1 to 10 mm, preferably about 0.5 to 5 mm and most preferably about 1 to 3 mm.

After optional sanding, the layer may have a depth of around 0.05 to 5 mm, preferably about 1 to 2 mm and most preferably about 0.5 to 1 mm. The thus produced composite is comparable in its workability to monolithic (single layer) composites. It can be flexed, cut, drilled and fixed by nails etc to a frame without surface cracking or chipping.

The applicants have found an extremely good interlaminer bond and compatibility between the dewatered slurry layer and base layer resulting in excellent composite action, compatibility and resistance to delamination.

The term 'hydraulic binder' as used throughout the specification refers to a pulverised material in the solid, dry state which, when mixed with water, yields plastic mixtures that are able to set and harden, for example a cement. Included within the definition are white, grey or pigmented cements and hydraulic limes.

The term 'cement' includes hydraulic and alite cements such as portland cement, blended cements such as portland cement blended with fly ash, blast-furnace slag, pozzalans and the like and mixtures thereof, masonry cement, oil well cement, natural cement, alumina cement, expansive cements and the like, or mixtures thereof.

The quantity of binder in the formulation is preferably between about 10 to 50 wt % based on the total dry ingredients, more preferably about 15 to 40 wt % and most preferably about 20 to 30 wt %.

The fly ash used in the preferred embodiments provides a number of advantages including, particularly, as an aid to dewatering of the slurry as defined above.

The term 'fly ash' as used herein refers to a solid powder having a chemical composition similar to or the same as the composition of material that is produced during combustion of powdered coal, ie about 25 to 60 wt % silica, about 10 to 30 wt % $Al_2O_3$, about 5 to 25 wt % $Fe_2O_3$, about 0 to 20 wt % CaO and about 0 to 5 wt % MgO.

In another preferred embodiment, the dewatering agent may include a coarse fraction fly ash which is greater than about 100 microns. This coarse fraction fly ash includes bottom ash or similar products from coal combustion. There is an advantage to using these products over the aforementioned particle size fly ash since it is cheaper. Of course, as will be clear to persons skilled in the art, some reformulation of the slurry may be required to provide a suitable coating and appropriate dewatering characteristics when the dewatering agent is such a coarse fraction fly ash.

Fly ash particles are typically spherical and range in diameter from about 1 to 100 microns. In a preferred embodiment, the fly ash comprises two components. A first 'larger' size particles of fly ash with preferably about a 100 micron maximum size. This size range of fly ash is used in the slurry to aid in improving the dewatering characteristics of the slurry but also as a moderately reactive pozzalan.

The second 'smaller' fly ash size zone which preferably has about a 10 micron maximum size also adds an improving dewatering characteristic but is a more highly reactive pozzalan. This 'smaller' fly ash particle zone also improves the sanded surface quality of the finish layer.

In a preferred embodiment, the first fly ash comprises about 10 to 60 wt % of the formulation based on total dry ingredients, more preferably about 20 to 50 wt % and most preferably about 30 to 40 wt %.

The second fly ash component preferably provides about 5 to 30 wt % of the formulation based on total dry ingredients, more preferably about 10 to 25 wt % and most preferably about 15 to 20%.

The functional layers may optionally contain other additives such as fillers. Such fillers may also be used to improve the dewatering characteristics of the slurry. For example, cenospheres (hollow ceramic microspheres) diatomite, wollastonite, ground rice hulls, ground perlite or the like, are particularly suitable for this purpose.

These and other fillers may also be used to provide additional benefits, for example calcium carbonates or alumina hydrates improve sandability and flexibility of the coated layer respectively. Silica flour improves hardness of the sanded surface of the coating layer and the acoustic/thermal insulation properties of the layer can be improved by including rubber particles, vermiculite, perlite, shredded or expanded polystyrene or gypsum.

The fillers preferably comprise about 5 to 30 wt % of the formulation based on total dry ingredients, more preferably about 10 to 25 wt % and most preferably about 25 to 20 wt %.

The functional layers may also contain other organic additives. Cement plasticising agents, for example, may be used to alter the rheology of the slurry. Suitable cement plasticising agents include melamine sulphonate formaldehyde condensates, naphthalene sulphonate formaldehyde condensates, naphthalene sulphonates, calcium lignosulphonates, sodium lignosulphonates, saccharose, sodium gluconate, sulphonic acids, carbohydrates, amino carboxylic acids, polyhydroxycarboxilic acids, sulphonated melomine and the like.

The amount of cement plasticiser of course will depend upon the fluidising ability of the particular plasticisers. Generally the quantity of plasticiser will be in the range of about 0.3 to 3 wt % and more preferably about 0.5 to 2 wt % based on the total of dry ingredients in the formulation.

Particularly preferred cement plasticisers are Melment F-10, a melamine formaldehyde sodium bisulphate polymer dispersant marketed by SKW-Trostburg in the form of a fine white powder. Another suitable plasticiser is Neosyn, a condensed sodium salt of sulphonated naphthalene formaldehyde available from Hodgson Chemicals.

Another preferred component in the coating is a biopolymer which acts to enhance the flowability, segregation resistance and self levelling qualities of the cementitious slurry. Particularly suitable bioplymers are xanathan gum and/or whelan gum, eg KELCO-CRETE, K1C 376 manufactured by Monsanto.

Latex may also be included in the formulation to improve adherence, elasticity, stability and impermeability of the functional layers. The latex also improves flexibility of the formed composite.

The latex may be selected from the group consisting of acrylic latex, styrene latex, butadiene latex or mixtures thereof and is provided preferably in an amount between about 0.5 to 20%, more preferably about 1 to 15% and most preferably about 10% by weight of cement (on polymer solids basis) solids.

Vinyl polymers may also be incorporated into the formulation either in addition or as a substitute to the latex emulsions. Such vinyl polymers or equivalent polymeric materials enhance adhesion, resilience and flexural strength and abrasion resistance of the functional layer.

Preferred vinyl polymers include polyvinyl acetate or a copolymer vinyl acetate with another monomer such as ethylene. A particularly preferred vinyl acetate resin is VINNAPAS LL5044 thermo plastic resin powder which contains a vinyl acetate-ethylene copolymer available from Wacker. Such powdered vinyl polymer is preferably provided in quantities similar to the latex emulsion referred to above.

In addition to the above, conventional other additives such as mineral oxides, hydroxides and clays, metal oxides and hydroxides, fire retardants such as magnesite, thickeners, silica fume or amorphous silica, water sealing agents, water reducing agents, setting modifiers, hardeners, dispersants, foaming agents or flocculating agents, waterproofing agents and density modifiers are suitable for use with the present invention.

In this regard, one particular advantage arising from the preferred embodiments is the ability to treat the product to be coated by providing additives in the functional layer. To explain, since the slurry is dewatered through the product to be coated, it is possible to provide additives to the base layer by incorporation in the slurry. For instance, a waterproofing agent such as silane may be included in the formulation in excess of the functional layer requirements. During dewatering, the silane will be drawn into and through the base layer being coated thereby treating the base layer. This simultaneous treatment of the base layer as well as providing a functional attribute via the deposited layer is a valuable additional benefit arising from the aforedescribed method.

EXAMPLES

The present invention will now be described by way of example only with reference to the following embodiments.

In each of the following examples, the product was produced as follows.

Step 1 Slurry Preparation

A slurry of the formulation is prepared by mixing the hydraulic binder, fly ash and other optional components with water. The solids content in the slurry is preferably between about 50 and 90%, more preferably about 55 to 80% and most preferably about 60 to 70%.

Step 2 Slurry Application/Dewatering

The slurry is applied to the base layer by any convenient means such as brushes rollers, knives or sprays etc. The slurry is designed to self level and form a uniform coating on the product. The building product to be coated exhibits s certain degree of porosity causing the slurry to dewater and form a uniform deposited cementitious layer. Time for dewatering can vary quite dramatically but normally occurs between about 10 and 90 seconds, depending on the porosity of the material to be coated, its water content and thickness and viscosity of the slurry formulation. A vacuum may be used to reduce the slurry dewatering time if required. This is particularly useful when tailoring the coating process to the speed of a building product forming process, eg between about 40 to 45 seconds on a Hatschek production line.

Step 3 Curing

After forming, the green laminate article comprising the building product plus coating is preferably precured for a short time, eg up to about 48 hours, then cured by air/moist curing at room temperature, steam curing between about 40 and 90° C. or autoclaving in a steam pressure vessel between about 120 and 200° C.

For either of these three curing techniques, a curing time range between about 6 and 72 hours, preferably up to about 48 hours, is suitable. Of course, as will be clear to persons skilled in the art, the length of time chosen for curing is dependent on the formulation, the manufacturing process and form of the article.

The following examples relate to specific formulation compositions.

Example 1

Sandable Dewatered Slurry Composition

Function: sandable, durable finishing layer for facade applications.

The low viscosity slurry (drainage time in 50 ml volume funnel=3.4 seconds) was applied on the base layer (Hardiform™ 12 mm thick cellulose fibre reinforced cement-based green sheet manufactured by James Hardie Industries). The slurry dewatered in 90 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 30 | 12000 |
| Silica Flour (400 G grade) | 10 | 4000 |
| Fly ash (larger size fraction) | 40 | 16000 |
| Fly ash (smaller size fraction) | 20 | 8000 |
| Total | 100 | 40000 |
| Water (W) | | 14000 |
| Water/Solids (W/S ratio) | 0.35 | |
| Solids Content (W/W + S) | 0.74 | |
| Organic Additives | | |
| Welan Gum (Kelcocrete) | 0.0075 | 3.0 |
| naphthalene formaldehyde Plasticising Agent (Neosyn) | 0.25 | 100.0 |
| Acrylic Emulsion Rhoplex MC1934 | 1.0 | 400.0 |

Example 2

Rubberised Dewatered Slurry Composition

Function: In skid-resistant flooring, hard wearing static dissipative flooring and acoustic insulating ceiling panels.

The low viscosity slurry (drainage time in 50 ml volume funnel=4.2 seconds) was applied on the base layer (Hardiform™ 12 mm thick cellulose fibre reinforced cement-based green sheet manufactured by James Hardie Industries). The slurry dewatered in 60 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 30 | 12000 |
| Recycled Rubber crumbs (minus 30 mesh) | 10 | 4000 |
| Fly ash (larger size fraction) | 40 | 16000 |
| Fly ash (smaller size fraction) | 20 | 8000 |
| Total | 100 | 40000 |
| Water | | 13000 |
| Water/Solids (W/S ratio) | 0.325 | |
| Solids Content (W/W + S) | 0.755 | |
| Organic Additives | | |
| Welan Gum (Kelcocrete) | 0.0075 | 3.0 |
| naphthalene formaldehyde Plasticising Agent (Neosyn) | 0.25 | 100.0 |
| Acrylic Emulsion Rhoplex MC1934 | 1.0 | 400.0 |

Example 3

Flexible & Sandable Dewatered Slurry Composition

Function: Flexible & sandable layer on thin fibre cement reinforced cement-based lining.

The low viscosity slurry (drainage time in 50 ml volume funnel=2.8 seconds) was applied on the base layer (Hardiflex™ 4.5 mm thick cellulose fibre reinforced cement-based green sheet manufactured by James Hardie Industries). The slurry dewatered in 120 seconds (un-aided by vacuum) forming a 1.25 mm thick coating. The coated sheet was precured for 48 hours then was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 20 | 8000 |
| Calcium Carbonate Grade 10 (40 um avg. size) | 10 | 4000 |
| Alumina Tn-hydrate (80 um avg. size) | 5 | 2000 |

-continued

| Slurry Composition | % by total weight of solids (S) | Weight in gm |
|---|---|---|
| Fly ash (larger size fraction) | 45 | 18000 |
| Fly ash (smaller size fraction) | 20 | 8000 |
| Total | 100 | 40000 |
| Water | | 12000 |
| Water/Solids (W/S ratio) | 0.30 | |
| Solids Content (W/W + S) | 0.77 | |
| Organic Additive | | |
| Welan Gum (Kelcocrete) | 0.0075 | 3.0 |
| naphthalene formaldehyde | 0.25 | 100.0 |
| Plasticising Agent (Neosyn) | | |
| Styrene Acrylic Latex Emulsion (56% solids) | 5 | 2000 |

Example 4

Flexible & Sandable Dewatered Slurry Composition (Low Cement)

Function: Flexible & sandable layer on thin fibre cement reinforced cement-based lining.

The low viscosity slurry (drainage time in 50 ml volume funnel=4.5 seconds) was applied on the base layer (Hardiflex™ 4.5 mm thick cellulose fibre reinforced cement-based green sheet manufactured by James Hardie Industries). The slurry dewatered in 90 seconds (un-aided by vacuum) forming a 1.25 mm thick coating. The coated sheet was autoclave-cured for 8 hrs at 180° C. temperature and 0.80 MPa pressure. It was then sanded flat to 0.60 mm thick using industrial sanders equipped with 100 grit sand paper belts.

| Slurry Composition | % by total weight of solids (S) | Weight in gm |
|---|---|---|
| Dewatered Cementitious Composition | | |
| Portland Cement | 10 | 4000 |
| Calcium Carbonate Grade 10 (40 um avg. size) | 20 | 8000 |
| Alumina Tn-hydrate (80 um avg. size) | 5 | 2000 |
| Fly ash (larger size fraction) | 40 | 18000 |
| Fly ash (smaller size fraction) | 25 | 10000 |
| Total | 100 | 40000 |
| Water | | 16000 |
| Water/Solids (W/S ratio) | 0.40 | |
| Solids Content (W/W + S) | 0.715 | |
| Organic Additives | | |
| Welan Gum (Kelcocrete) | 0.0075 | 3.0 |
| naphthalene formaldehyde | 0.25 | 100.0 |
| Plasticising Agent (Neosyn) | | |
| Vinyl acetate-ethylene powdered copolymer (Vinnapas LL5004) | 1.625 | 650 |

The aforementioned examples provide a composite comparable in workability to monolithic or single layer composites. They can be flexed, cut, drilled or fixed by nails or the like to a frame without surface cracking or chipping.

The surface is 'finish-ready' and remains smooth, flat, crack-free and with low permeability even when used in a curved configuration.

Each example provided excellent interlaminer bond between the base sheet and coating exhibiting good composite action, compatibility and resistance to delamination.

The applicants have developed a unique process which allows them to combine fibre reinforced layers with functional dewatered slurry layers optional reinforced with a wide range of synthetic or natural fibres, eg polypropylene, glass, PVA, cellulose fibres etc. The outcome of the aforementioned method is to produce a fibre reinforced composite with strength, water resistance, incombustibility of fibre cement with a low density, surface finish and insulation properties of, for example, gypsum board.

The applicants have found that using the techniques described herein, functional layers can be added to the substrate layer with no delamination or incompatibility between the layers, ie no differential shrinking, warping or similar properties.

It will be understood by persons skilled in the art that the present invention may be embodied in other forms without departing form the spirit or scope of the inventive idea as described herein. In particular, it will be appreciated that the formulations, coatings, additives, methods and composite products of the present invention are suitable or may be adapted for use in conjunction with the methods and apparatus as described in the various priority documents.

What is claimed is:

1. A composite product comprising a substrate layer and one or more functional layers applied thereto, each functional layer including a mixture of hydraulic binder and a dewatering agent wherein the dewatering agent comprises fly ash, and a reinforcing layer at least partially covering said functional layer, said reinforcing layer comprising a fiber reinforced cementitious layer.

2. A composite product according to claim 1, wherein additives and/or fillers are incorporated in the functional layer(s) to provide the desired acoustic properties, thermal or fire performance, density modification, cost or production efficiency, compressive or tensile strength, water permeability, density or aesthetic properties to the composite product.

3. A composite product according to claim 1, wherein the dewatering agent is provided in a sufficient quantity to maintain porosity in the functional layer(s) and the substrate layer during dewatering.

4. A composite product according to claim 1, wherein the dewatering agent is a particulate material.

5. A composite product according to claim 1, wherein the dewatering agent is selected from the group consisting of fly ash, alumina trihydrate, silica flour, cenospheres and mixtures thereof.

6. A composite product according to claim 1, wherein the product is cured by air curing, steam curing or hydrothermally cured in an autoclave.

7. A composite product according to claim 1, wherein the product is a cementitious building board or product or gypsum building board.

8. A composite product according to claim 1, wherein the thickness of the functional layer on the product is between about 0.1 and 10 mm.

9. A composite product according to claim 1, wherein the hydraulic binder used in the functional layer is selected from the group consisting of white, grey or pigmented cements, hydraulic limes and mixtures thereof.

10. A composite product according to claim 1, wherein the binder in the functional layer is between about 10 and 50 wt % based on total dry ingredients.

11. A composite product according to claim 1, wherein the dewatering agent includes a coarse fraction fly ash having a particle size diameter greater than about 100 microns.

12. A composite product according to claim 1, wherein the functional layer includes additives to improve the properties of the substrate layer such that upon dewatering of the functional layer, the substrate layer is thus treated with said additive.

13. A composite product according to claim 1, wherein the quantity of dewatering agent is sufficient to permit de-watering of each functional layer through the substrate layer and any additional functional layer.

14. The composite material according to claim 1, wherein each functional layer includes one or more functional additives to provide one or more physical and/or chemical properties to that layer.

15. A composite product according to claim 1, wherein the substrate layer is a fibre reinforced base material.

16. A composite product according to claim 1, wherein the substrate layer is a reinforced cementitious product.

17. A composite product according to claim 1, wherein the functional layers are added to both sides of the substrate layer.

18. A composite product according to claim 1, wherein the functional layers are added to one side of the substrate layer.

19. A composite product according to claim 1, wherein the reinforcing layer comprises fibre mesh or netting.

20. A composite product comprising a substrate layer and one or more functional layers applied thereto, each functional layer including a mixture of hydraulic binder and determining agent wherein the dewatering agent comprises fly ash, the composite products having outer layers provided by fiber reinforced cementitious layers with one or more functional layers positioned therebetween.

21. A composite product according to claim 10, wherein the functional layers have a low fiber content relative to the fibre reinforced cementitious layers.

22. A composite product comprising a substrate layer and one or more functional layers applied thereto, each functional layer including a mixture of hydraulic binder, dewatering agent wherein the dewatering agent comprises:

i) about 10 to 60% of the formulation based on total dry ingredients of a first fly ash component having a particle diameter between about 1 and 100 microns; and ii) about 5 to 30% of the formulation based on total dry ingredients of a second fly ash component having a maximum particle size diameter of around 10 microns.

23. The composite material comprising:

a substrate layer; and a functional layer formed on a first surface of the substrate layer, the functional layer comprising a hydraulic binder and a determining agent, wherein the dewatering agent has a pre-selected configuration and is added in a pre-selected quantity to the hydraulic binder to shorten the dewatering time of the functional layer in a manner such that the drainage time of the functional layer in a 50 ml volume funnel is decreased to less than about 4.5 seconds, wherein the dewatering agent is selected from the group consisting of fly ash, alumina trihydrate, silica flour, cenospheres and mixtures thereof, wherein the dewatering agent comprises (i) about 10 to 60% of the formulation based on total dry ingredients of a first fly ash component having a particle diameter between about 1 and 100 microns; and (ii) about 5 to 30% of the formulation based on total dry ingredient of a second fly ash component having a maximum particle size diameter of about 10 microns.

24. The composite material of claim 23, wherein the functional layer comprises a slurry composition having a water to solids ratio of about 0.4 or less.

25. The composite material of claim 23, wherein the substrate layer comprises a fiber-cement material.

26. The composite material of claim 23, wherein the functional layer is about 1.25 mm thick and the water drainage time is less than about 120 seconds.

27. The composite material of claim 23, wherein the functional layer further comprises reinforcing fibers.

* * * * *

UNITED STATES PATENT AND TRADEMARK OFFICE
CERTIFICATE OF CORRECTION

PATENT NO.   : 6,893,751 B2
DATED        : May 17, 2005
INVENTOR(S)  : Basil Naji et al.

It is certified that error appears in the above-identified patent and that said Letters Patent is hereby corrected as shown below:

<u>Title page,</u>
Item [56], References Cited, FOREIGN PATENT DOCUMENTS,
delete "3/1993" and insert -- 3/1983 --; delete "3/199" and insert -- 3/1992 --.

<u>Column 11,</u>
Line 47, delete "determining" and insert -- dewatering --.

<u>Column 12,</u>
Line 1, delete "claim 10" and insert -- claim 20 --.
Line 16, after "material" add -- , --.
Line 21, delete "determining" and insert -- dewatering --.
Line 43, delete "fiber-cement" and insert -- fiber cement --.

Signed and Sealed this

Twenty-first Day of March, 2006

JON W. DUDAS
*Director of the United States Patent and Trademark Office*